United States Patent
Han et al.

(10) Patent No.: US 12,424,203 B2
(45) Date of Patent: Sep. 23, 2025

(54) ELECTRONIC DEVICE AND CONTROL METHOD THEREOF

(71) Applicant: SAMSUNG ELECTRONICS CO., LTD., Suwon-si (KR)

(72) Inventors: Youngho Han, Suwon-si (KR); Junmo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 422 days.

(21) Appl. No.: 17/968,307

(22) Filed: Oct. 18, 2022

(65) Prior Publication Data

US 2023/0119489 A1    Apr. 20, 2023

(30) Foreign Application Priority Data

Oct. 18, 2021    (KR) .................. 10-2021-0138323

(51) Int. Cl.
*G10L 15/00* (2013.01)
*G10L 15/08* (2006.01)
*G10L 15/22* (2006.01)

(52) U.S. Cl.
CPC .............. *G10L 15/08* (2013.01); *G10L 15/22* (2013.01); *G10L 2015/088* (2013.01)

(58) Field of Classification Search
CPC ......... G10L 15/08; G10L 15/26; G10L 15/14; G10L 15/04; G10L 15/183; G10L 15/1822; G10L 15/16; G10L 15/02; G10L 15/005; G10L 2015/223; G10L 15/22; G10L 2015/088

See application file for complete search history.

(56) References Cited

U.S. PATENT DOCUMENTS

| | | | |
|---|---|---|---|
| 5,890,108 A * | 3/1999 | Yeldener ................ | G10L 19/18 |
| | | | 704/223 |
| 10,217,453 B2 | 2/2019 | Stevans et al. | |
| 10,672,380 B2 | 6/2020 | Georges et al. | |
| 10,839,158 B2 | 11/2020 | Ji et al. | |
| 11,322,157 B2 * | 5/2022 | Vaquero .................. | G10L 17/04 |
| 11,935,526 B2 * | 3/2024 | Bromand ................ | G10L 15/26 |
| 2003/0200090 A1 * | 10/2003 | Kawazoe ................ | G10L 15/00 |
| | | | 704/E15.001 |
| 2016/0293168 A1 * | 10/2016 | Chen ....................... | G10L 15/22 |
| 2018/0047387 A1 * | 2/2018 | Nir .......................... | G10L 15/02 |
| 2018/0293974 A1 | 10/2018 | Georges et al. | |
| 2020/0013407 A1 * | 1/2020 | Chae ....................... | G06F 3/167 |
| 2020/0152177 A1 | 5/2020 | Tang | |

(Continued)

*Primary Examiner* — Abdelali Serrou
(74) *Attorney, Agent, or Firm* — Sughrue Mion, PLLC

(57) ABSTRACT

A control method of an electronic device includes receiving a voice signal including a wake-up word and an instruction word for activating a voice recognition function, performing first voice recognition by acquiring at least one first candidate text in each frame of a first plurality of predetermined frames for a first voice signal section corresponding to the wake-up word in the voice, performing second voice recognition by acquiring at least one second candidate text in each frame of a second plurality of predetermined frames for a second voice signal section corresponding to the instruction word in the voice signal and performing second voice recognition, and providing a function corresponding to the instruction word based on results of the first voice recognition and the second voice recognition.

18 Claims, 10 Drawing Sheets

(56) References Cited

U.S. PATENT DOCUMENTS

| | | |
|---|---|---|
| 2020/0227024 A1 | 7/2020 | Rozen et al. |
| 2020/0242198 A1* | 7/2020 | Ji .......................... G10L 15/16 |
| 2021/0304759 A1* | 9/2021 | Bauer .................... G10L 15/22 |

* cited by examiner

FIG. 5
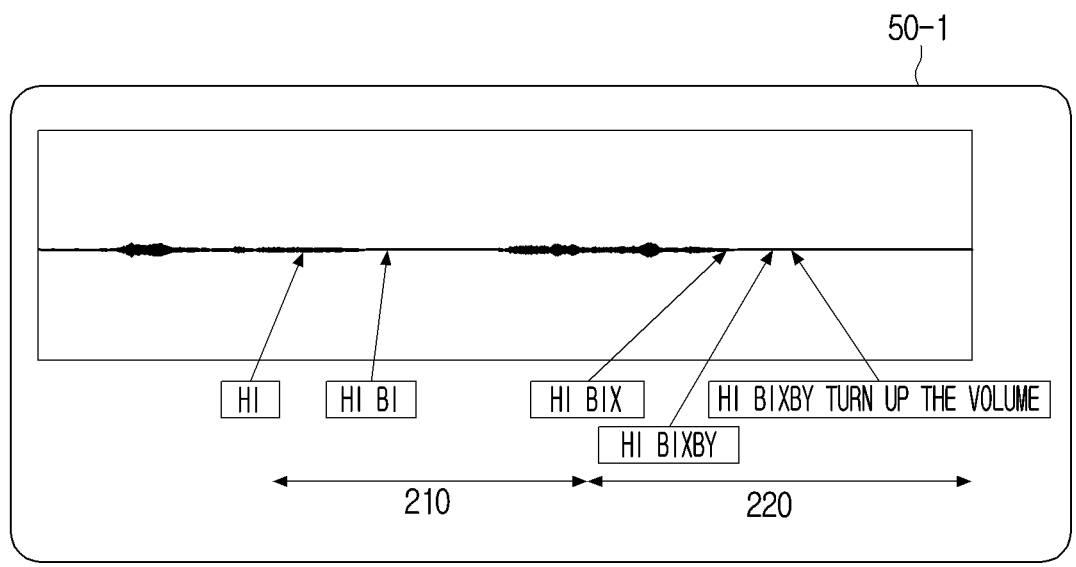
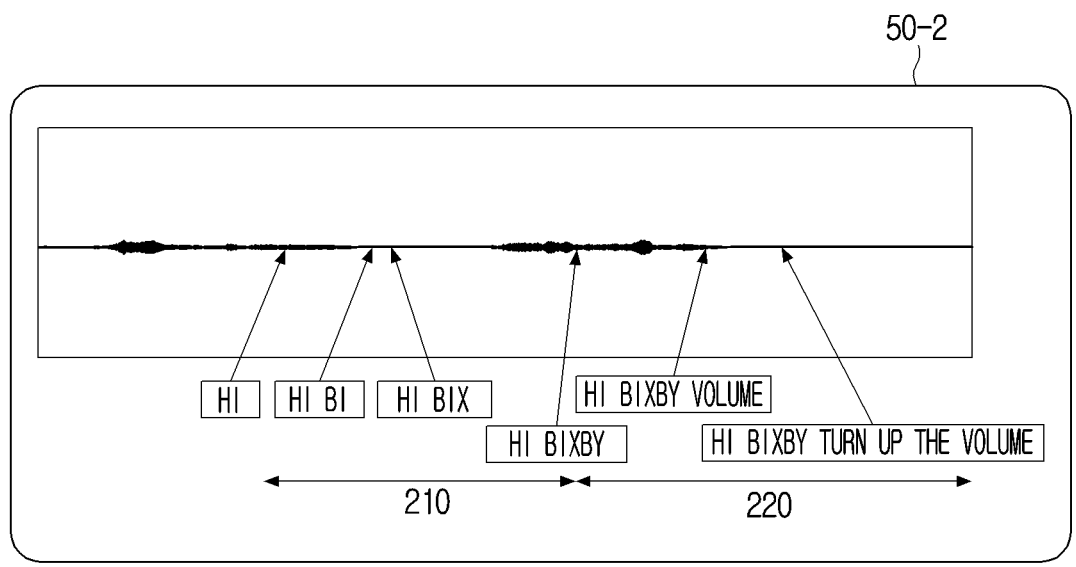

ELECTRONIC DEVICE AND CONTROL METHOD THEREOF

CROSS-REFERENCE TO RELATED APPLICATION(S)

This application is based on and claims priority under 35 U.S.C. § 119(a) of a Korean patent application number 10-2021-0138323 filed on Oct. 18, 2021, in the Korean Intellectual Property Office, the disclosure of which is incorporated by reference herein in its entirety.

BACKGROUND

1. Field

The disclosure relates to an electronic device and a control method thereof, and more particularly, to an electronic device performing voice recognition, and a control method thereof.

2. Description of Related Art

Recently, the amount of information that exists on-line and off-line is increasing exponentially, and as electronic communication technologies develop, users can acquire information that they want anytime anywhere through electronic devices.

In this regard, in order for an electronic device to appropriately perform an operation that a user wants, a voice recognition system that generates a control instruction corresponding to a user's voice instruction is being used widely.

Also, an artificial intelligence system implementing intelligence of a human level is used in various fields, and in various systems in an artificial intelligence system, an instruction response system is utilized.

Accordingly, in the related art, wake-ups and voice recognition are processed by two methods. First, there is a method of performing voice recognition from the time point when a wake-up is completed, and second, there is a method of performing voice recognition from the time point when a wake-up starts. The first method has an advantage of reducing the calculation amount of the voice recognition system, but as voice information of a speaker included in the wake-up disappears, the system becomes sensitive to ambient noises, and due to an error that may occur in prediction of an end point of a wake-up word, reduction of a voice recognition rate may occur. In contrast, the second method uses voice information of a speaker included in a wake-up in an opposite manner to the first method, and thus the system is strong against ambient noises, and there is no error that may occur in detection of an end point of a wake-up, and thus accuracy of voice recognition can be improved. However, as a wake-up word should be recognized redundantly, there are problems that the calculation amount increases, and the usage amount of the memory increases. In particular, in a situation where limited resources have to be used in an on device environment, these may become big problems.

SUMMARY

Provided are an electronic device for maintaining a voice recognition performance, and effectively reducing the time or the processing amount spent for voice recognition, and a control method thereof.

A control method of an electronic device according to an embodiment of the disclosure includes receiving a voice signal including a wake-up word and an instruction word for activating a voice recognition function, performing first voice recognition by acquiring at least one first candidate text in each frame of a first plurality of predetermined frames for a first voice signal section corresponding to the wake-up word in the voice signal, performing second voice recognition by acquiring at least one second candidate text in each frame of a second plurality of predetermined frames for a second voice signal section corresponding to the instruction word in the voice signal, and providing a function corresponding to the instruction word based on results of the first voice recognition and the second voice recognition.

The performing the first voice recognition may include, based on the first voice signal section, identifying whether the wake-up word is received by using a wake-up engine for identifying the wake-up word in the voice signal, and performing the first voice recognition based on an automatic speech recognition (ASR) model for converting a voice signal into a text by acquiring the at least one first candidate text in each frame of the first plurality of predetermined frames for the first voice signal section corresponding to the wake-up word.

The performing the second voice recognition may include, based on identifying that the wake-up word is received through the wake-up engine, performing the second voice recognition by acquiring the at least one second candidate text in each frame of the second plurality of predetermined frames for the second voice signal section.

The performing the first voice recognition may include acquiring one text corresponding to each frame of the first plurality of predetermined frames for the first voice signal section by using the ASR model, and the performing the second voice recognition may include acquiring a plurality of text candidates corresponding to each frame of the second plurality of predetermined frames for the second voice signal section by using the ASR model.

The performing the second voice recognition may include, based on the plurality of acquired text candidates corresponding to the second voice signal section, identifying a text corresponding to the second voice signal section.

The control method may further include, based on identifying that the wake-up word is not received through the wake-up engine, not performing voice recognition for the second voice signal section.

The performing the second voice recognition may include performing the second voice recognition by acquiring the at least one second candidate text in each frame of the second plurality of predetermined frames for remaining sections excluding the first voice signal section in the voice signal.

The performing the first voice recognition may include, while performing voice recognition by acquiring the at least one second candidate text in each frame of the second plurality of predetermined frames for the voice signal, based on identifying the first voice signal section corresponding to the wake-up word, performing the first voice recognition by acquiring the at least one first candidate text in each frame of the first plurality of predetermined frames from a starting time point of the first voice signal section, and the performing the second voice recognition may include, based on the first voice signal section ending while performing the first voice recognition, performing the second voice recognition by acquiring the at least one second candidate text in each frame of the second plurality of predetermined frames from an ending time point of the first voice signal section.

The performing the first voice recognition may include, while performing the second voice recognition, based on identifying a voice signal section corresponding to a recognition unit of the ASR model in the wake-up word, performing the first voice recognition.

In the method, a time duration of each frame of the first plurality of predetermined frames may be a same as a time duration of each frame of the second plurality of predetermined frames.

An electronic device according to an embodiment of the disclosure includes a memory including at least one instruction, a microphone, and a processor configured to execute the at least one instruction to receive a voice signal including a wake-up word and an instruction word for activating a voice recognition function through the microphone, perform first voice recognition by acquiring at least one first candidate text in each frame of a first plurality of predetermined frames for a first voice signal section corresponding to the wake-up word in the voice signal and perform first voice recognition, perform second voice recognition by acquiring at least one second candidate text in each frame of a second plurality of predetermined frames for a second voice signal section corresponding to the instruction word in the voice signal, and provide a function corresponding to the instruction word based on results of the first voice recognition and the second voice recognition.

The processor may be configured to, based on the first voice signal section, identify whether a wake-up word is received by using a wake-up engine for identifying the wake-up word in the voice signal, and while receiving the voice signal, by using, perform the first voice recognition based on an automatic speech recognition (ASR) model for converting a voice signal into a text by acquiring the at least one first candidate text in each frame of the first plurality of predetermined frames for the first voice signal section corresponding to the wake-up word.

The processor may be configured to, based on identifying that the wake-up word is received through the wake-up engine, perform the second voice recognition by acquiring the at least one second candidate text in each frame of the second plurality of predetermined frames for the second voice signal section.

The processor may be configured to acquire one text corresponding to each frame of the first plurality of predetermined frames for the first voice signal section by using the ASR model, and acquire a plurality of text candidates corresponding to each frame of the second plurality of predetermined frames for the second voice signal section by using the ASR model.

The processor may be configured to, based on the plurality of acquired text candidates corresponding to the second voice signal section, identify a text corresponding to the second voice signal section.

The processor may be configured to, based on identifying that the wake-up word is not received through the wake-up engine, control the ASR model to not perform voice recognition for the second voice signal section.

The processor is configured to perform the second voice recognition by acquiring the at least one second candidate text in each frame of the second plurality of predetermined frames for remaining sections excluding the first voice signal section in the voice signal.

The processor may be configured to, while performing voice recognition by acquiring the at least one second candidate text for the voice signal, based on identifying the first voice signal section corresponding to the wake-up word, perform the first voice recognition by acquiring the at least one first candidate text in each frame of the first plurality of predetermined frames from a starting time point of the first voice signal section, and base on the first voice signal section ending while performing the first voice recognition, perform the second voice recognition by acquiring the at least one second candidate text in each frame of the second plurality of predetermined frames from an ending time point of the first voice signal section. The processor may be configured to, while performing the second voice recognition, based on identifying a voice signal section corresponding to a recognition unit of the ASR model in the wake-up word, perform the first voice recognition.

In the electric apparatus, a time duration of each frame of the first plurality of predetermined frames is a same as a time duration of each frame of the second plurality of predetermined frames.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a diagram for illustrating an intermediate text provided while performing voice recognition for a voice signal according to an embodiment of the disclosure;

DETAILED DESCRIPTION

Hereinafter, embodiments of the disclosure will be described in detail with reference to the drawings.

Figure 1:
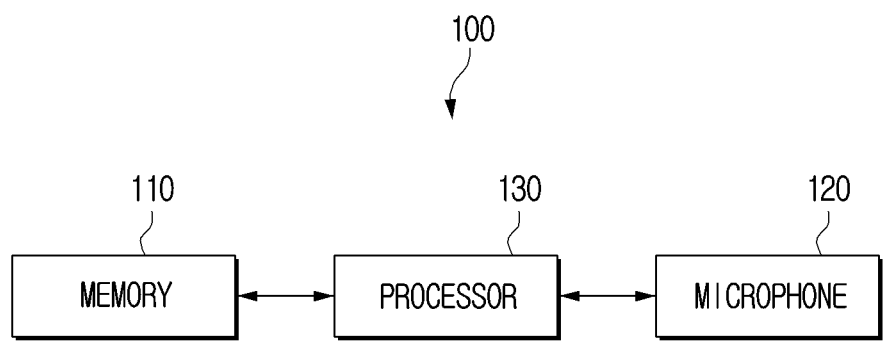
FIG. 1 is a block diagram for illustrating an operation of an electronic device 100 according to an embodiment of the disclosure.

FIG. 1 is a block diagram for illustrating an operation of an electronic device 100 according to an embodiment of the disclosure.

As illustrated in FIG. 1, the electronic device 100 may include a memory 110, a microphone 120, and a processor 130. The electronic device 100 may be implemented as electronic devices in various forms such as a smartphone, an AR glass, a tablet PC, a mobile phone, a video phone, an e-book reader, a TV, a desktop PC, a laptop PC, a netbook computer, a workstation, a camera, and a smart watch. However, the electronic device 100 is not limited to the above-described components, and it is obvious that some components can be added or omitted according to the type of the electronic device.

The memory 110 may store at least one instruction or data related to at least one other component of the electronic device 100. In particular, the memory 110 may be implemented as a non-volatile memory, a volatile memory, a flash-memory, a hard-disk drive (HDD), or a solid state drive (SSD), etc. The memory 110 may be accessed by the processor 130, and reading/recording/correction/deletion/update, etc. of data by the processor 130 may be performed.

In the disclosure, the term 'memory' may include the memory 110, a ROM (not shown) or a RAM (not shown) in the processor 130, or a memory card (not shown) (e.g., a micro SD card, a memory stick) installed in the electronic device 100. Also, programs and data, etc. for constituting various kinds of screens to be displayed in the display area of the display may be stored in the memory 110.

As described above, the memory 110 may store at least one instruction. Here, the instruction may be for controlling the electronic device 100. For example, an instruction related to a voice recognition system for performing an operation regarding a voice instruction of a user may be stored in the memory 110. Specifically, the memory 110 may include a plurality of components (or modules) constituting the voice recognition system according to the disclosure.

Also, the memory 110 may store an artificial intelligence agent for performing the voice recognition system. Specifically, the electronic device 100 may use an artificial intelligence agent for generating a natural language in response to a user utterance. Here, the artificial intelligence agent is a dedicated program for providing artificial intelligence (AI)-based services (e.g., a voice recognition service, an agent service, a translation service, a search service, etc.). The artificial intelligence agent may be executed by a conventional generic-purpose processor (e.g., a CPU) or a separate AI-dedicated processor (e.g., a GPU, etc.).

The microphone 120 is a component for the electronic device 100 to receive an input of a voice signal. Specifically, the microphone 120 may receive an external voice signal, and process the voice signal as electronic voice data. In this case, the microphone 120 may transmit the processed voice data to the processor 130.

The processor 130 may be electronically connected with the memory 110, and control the overall operations and functions of the electronic device 100. The processor 130 may include one or a plurality of processors. Here, the one or plurality of processors may be generic-purpose processors such as a central processing unit (CPU), an application processor (AP), etc., graphics-dedicated processors such as a graphics processing unit (GPU), a visual processing unit (VPU), etc., or artificial intelligence-dedicated processors such as a neural processing unit (NPU), etc.

The one or plurality of processors perform control to process input data according to a predefined operation rule or an artificial intelligence model stored in the memory 110. The predefined operation rule or the artificial intelligence model is characterized in that it is made through learning. Here, being made through learning means that a predefined operation rule or an artificial intelligence model having desired characteristics is made by applying a learning algorithm to a plurality of learning data. Such learning may be performed in a device itself where artificial intelligence is performed, or through a separate server/system.

The artificial intelligence model may include a plurality of neural network layers. Each layer has a plurality of weight values, and performs an operation of a layer through an operation between the operation result of the previous layer and the plurality of weight values. Examples of a neural network include a convolutional neural network (CNN), a deep neural network (DNN), a recurrent neural network (RNN), a restricted Boltzmann machine (RBM), a deep belief network (DBN), a bidirectional recurrent deep neural network (BRDNN), and deep Q-networks, but the neural network in the disclosure is not limited to the above-described examples.

The processor 130 may drive the operation system or an application program, and control hardware or software components connected to the processor 130, and perform various kinds of data processing and operations. Also, the processor 130 may load instructions or data received from at least one of other components on a volatile memory and process the instructions or data, and store various data in a non-volatile memory.

The processor 130 may be electronically connected with the memory 110, and control the overall operations and functions of the electronic device 100. The processor 130 may receive a voice signal including a wake-up word and an instruction word for activating voice recognition by executing at least one instruction stored in the memory 110. For example, the processor 130 may receive a voice signal including a wake-up word and an instruction word for activating voice recognition through the microphone 120. However, the disclosure is not limited thereto, and the processor 130 may receive a voice signal including a wake-up word and an instruction word for activating voice recognition through a microphone outside the electronic device 100.

Here, 'a wake-up word' is a word for activating the voice recognition function of the electronic device 100, and it may also be referred to as 'a trigger word.' For example, if the processor 130 receives a voice signal including 'a wake-up word,' the processor 130 may perform voice recognition for a voice signal corresponding to an instruction word after 'a wake-up word' included in the voice signal, and provide the voice recognition function.

Also, while receiving a voice signal, the processor 130 may identify a first voice signal section corresponding to a wake-up word in the voice signal. Then, the processor 130 may perform first voice recognition by acquiring a first number of candidate texts in each frame (e.g., 10 ms) of a plurality of predetermined frames for the identified first voice signal section. That is, the processor 130 may perform voice recognition through the first voice recognition method of acquiring the first number of candidate texts in each frame (e.g., 10 ms) of the plurality of predetermined frames for the identified first voice signal section.

For example, the processor 130 may acquire the first number of candidate texts corresponding to each frame (e.g., 10 ms) of the plurality of predetermined frames for the first voice signal section by using an ASR model for converting a voice signal into a text. Here, the first number may be one, and in this case, the processor 130 may acquire one text corresponding to each frame (e.g., 10 ms) of the plurality of predetermined frames for the first voice signal section by using the ASR model, and sum up the texts, and identify a text corresponding to the first voice signal section.

The ASR model according to the disclosure is a component for converting a voice signal (e.g., a user voice instruction) received at an electronic device into a text, and it is a component performing the first voice recognition and the second voice recognition according to the disclosure. For example, the ASR model may include an utterance recognition module. The utterance recognition module may include an acoustic model and a language model. For example, the acoustic model may include information related to vocalization, and the language model may include information on unit phonemes and information on combinations of unit phonemes. The utterance recognition module may convert a voice signal into text data by using the information related to vocalization and the information regarding unit phonemes. The information on the acoustic model and the language model may be stored, for example, in an automatic speech recognition database (ASR DB). Then, when a text corresponding to the voice signal is acquired through the ASR model, the processor 130 may transmit the acquired text to various components for performing the voice recognition function (e.g., a natural language understanding (NLU) module, etc.), and identify 'the meaning,' the intent,' etc. corresponding to the text, and provide a function corresponding to an instruction word included in the voice signal.

Also, while receiving a voice signal, the processor 130 may identify a second voice signal section corresponding to an instruction word in the voice signal. Then, the processor 130 may perform second voice recognition by acquiring a second number of candidate texts in each frame (e.g., 10 ms) of a plurality of predetermined frames for the identified second voice signal section. That is, the processor 130 may perform voice recognition through the second voice recognition method of acquiring the second number of candidate texts in each frame (e.g., 10 ms) of the plurality of predetermined frames for the identified second voice signal section.

For example, the processor 130 may acquire the second number of candidate texts corresponding to each frame (e.g., 10 ms) of the plurality of predetermined frames for the second voice signal section by using the ASR model for converting a voice signal into a text. Here, the second number may be a plural number (e.g., four), and in this case, the processor 130 may identify a text corresponding to the second voice signal section based on the acquired second number of candidate texts.

The first voice recognition according to the disclosure is a voice recognition method of acquiring the first number of candidate texts each frame of a plurality of predetermined frames for a voice signal in the ASR model, summing up all of the acquired candidate texts, and identifying a final text. Also, the second recognition is a voice recognition method of acquiring the second number of candidate texts greater than the first number of candidate texts of a voice signal in the ASR model, summing up all of the acquired candidate texts, and identifying a final text. That is, in the case of performing the first voice recognition, the amount of operations processed is reduced more than the case of performing the second voice recognition, but the accuracy may decline. However, in the case of 'a wake-up word,' a lot of training data is included, and thus the voice recognition rate of the ASR model is high. Accordingly, even if voice recognition is performed through the first voice recognition method, effective voice recognition can be performed.

The first voice recognition and the second voice recognition will be described later with reference to FIG. 4.

Also, the processor 130 may identify whether a wake-up word is received by using a wake-up engine for identifying a wake-up word. That is, if a voice signal including a wake-up word is received, the processor 130 may identify whether a wake-up word is included in the voice signal through the wake-up engine, and perform the first voice recognition for the voice signal through the ASR model. Then, if it is identified that a wake-up word is received through the wake-up engine, the processor 130 may acquire the second number of candidate texts in each frame of the plurality of predetermined frames for the second voice signal section in the voice signal, and perform the second voice recognition.

Further, the processor 130 may perform the first voice recognition for the first voice signal section in a voice signal, and perform the second voice recognition for the remaining sections. That is, the processor 130 may perform the second voice recognition by acquiring the second number of candidate texts in each frame of a plurality of frames for the remaining sections excluding the first voice signal section in a voice signal.

Also, while acquiring the second number of candidate texts in each frame of the plurality of frames for a received voice signal and performing the second voice recognition, if the first voice signal section corresponding to a wake-up word is identified, the processor 130 may acquire the first number of candidate text in each frame of the plurality of frames from the starting time point of the first voice signal section and perform the first voice recognition. For example, while performing the second voice recognition, if a voice signal section corresponding to a recognition unit (e.g., a syllable) of the first ASR model of the first word among wake-up words is identified, the processor 130 may perform the first voice recognition for the voice signal afterwards.

Further, if the first voice signal section ends while performing the first voice recognition, the processor 130 may perform the second voice recognition by acquiring the second number of candidate texts in each frame of the plurality of frames from the ending time point of the first voice signal section. As an example, while performing the first voice recognition, if a voice signal section corresponding to a recognition unit (e.g., a syllable) of the last ASR model of the last word among wake-up words is identified, the processor 130 may perform the second voice recognition for the voice signal afterwards.

In contrast, if it is identified that a wake-up word is not included in the voice signal through the wake-up engine, the processor 130 may not perform voice recognition for the second voice signal section. That is, the processor 130 may continuously perform voice recognition for a voice signal in a case where it is identified that a wake-up word is included in a voice signal through the wake-up engine.

In the above-described embodiment, voice recognition is performed through the first voice recognition method of acquiring the first number of candidate texts smaller than the second number of candidate texts for a voice signal section including a wake-up word, and voice recognition is performed through the second voice recognition method of acquiring the second number of candidate texts greater than the first number of candidate texts for a voice signal section including an instruction word, but the disclosure is not limited thereto. That is, the first voice recognition method may be various voice recognition methods where the processing amount of operations is smaller than that of the second voice recognition method, and the ASR model according to the disclosure may perform voice recognition for the first voice signal section corresponding to a wake-up word in a voice signal by various first voice recognition methods.

Through the above-described embodiments, the cost or the operation amount spent for voice recognition for a voice signal including a wake-up word and an instruction word is reduced.

Also, through the above-described embodiments, a voice corresponding to a wake-up is recognized together with an instruction word, and thus an error that may occur in detection of an ending point of a wake-up can be prevented beforehand, and a strong result is derived from noise sounds of ambient speakers by utilizing voice information of a speaker included in a wake-up voice, and at the same time, a design parameter of a beam search, etc. is flexibly controlled, and thus CPU and memory resources can be reduced effectively.

Figure 2A:
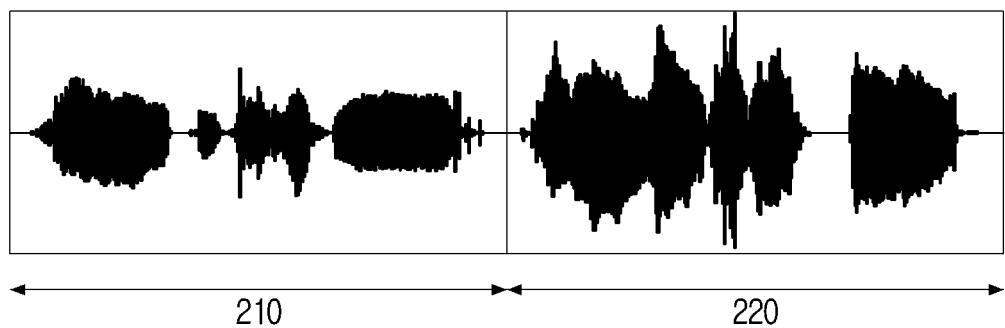
FIG. 2A is a diagram illustrating a voice signal including a wake-up word and an instruction word according to an embodiment of the disclosure.

FIG. 2A is a diagram illustrating a voice signal including a wake-up word and an instruction word according to an embodiment of the disclosure.

Figure 2B:
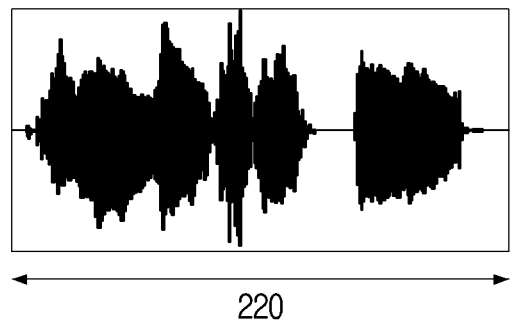
FIG. 2B is a diagram illustrating a voice signal including an instruction word.

FIG. 2B is a diagram illustrating a voice signal including an instruction word.

Figure 2C:
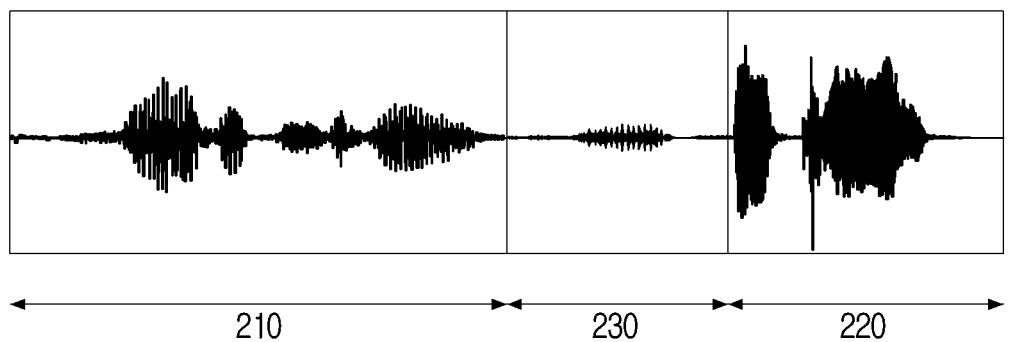
FIG. 2C is a diagram illustrating a voice signal including a wake-up word, an instruction word, and a noise according to an embodiment of the disclosure.

FIG. 2C is a diagram illustrating a voice signal including a wake-up word, an instruction word, and a noise according to an embodiment of the disclosure.

The electronic device 100 according to the disclosure may perform voice recognition for a voice signal including a wake-up word and an instruction word as in FIG. 2A. Specifically, the electronic device 100 may perform voice recognition for the first voice signal section 210 corresponding to a wake-up word and the second voice signal section 220 corresponding to an instruction word in FIG. 2A by using the ASR model.

In the related art, voice recognition is performed by acquiring the same number of candidate texts in each predetermined frame for the first voice signal section 210 and the second voice signal section 220. In this case, the operation amount spent for voice recognition of the first voice signal section 210 and the second voice signal section 220 increases, and thus a problem that it is not effective for voice recognition in an on-device environment may occur.

Also, in the case of performing voice recognition for the second voice signal section 220 excluding the first voice signal section 210 corresponding to a wake-up word as in FIG. 2B, a problem that the accuracy of voice recognition is reduced may occur. That is, as the ASR model performing voice recognition cannot acquire information of a speaker included in the first voice signal section 210 corresponding to a wake-up word, the accuracy of voice recognition is reduced.

In addition, in case that a noise signal section 230 corresponding to a noise is included between the first voice signal section 210 corresponding to a wake-up word and the second voice signal section 220 corresponding to an instruction word as in FIG. 2C, the accuracy of voice recognition can be improved only if voice recognition is performed by including the first voice signal section 210 corresponding to a wake-up word. That is, when the ASR model performing voice recognition processes the first voice signal section 210 corresponding to a wake-up word together, a noise that occurs midway can be filtered effectively.

Accordingly, the electronic device 100 according to the disclosure performs voice recognition for a voice signal including the first voice signal section 210 and the second voice signal section 220, and performs voice recognition through different voice recognition methods for the first voice signal section 210 and the second voice signal section 220, and thus the operation amount spent for voice recognition can be reduced. Specifically, for the first voice signal section 210, the electronic device 100 may perform voice recognition through a voice recognition method where the operation amount is smaller than that of the voice recognition method performed for the second voice signal section 220. For example, as illustrated in FIG. 1, for the first voice signal section, the electronic device 100 may perform the first voice recognition by acquiring the first number of candidate texts in each frame of the plurality of predetermined frames and perform the first voice recognition, and for the second voice signal section, the electronic device 100 may perform the second voice recognition by acquiring the second number of candidate texts greater than the first number of candidate texts.

Figure 3:
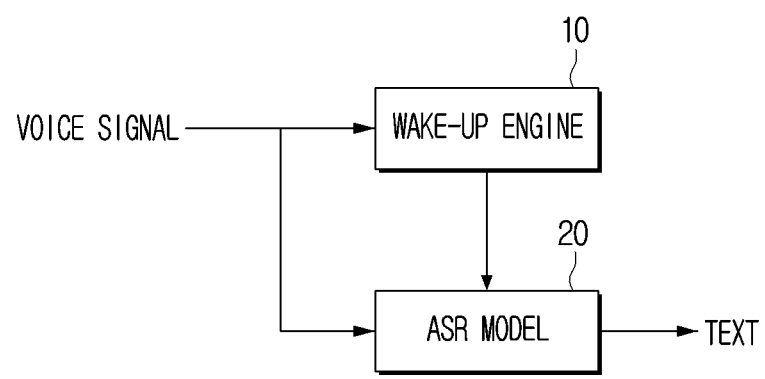
FIG. 3 is a diagram for illustrating a process of performing voice recognition through a wake-up engine and an ASR model according to the disclosure.

FIG. 3 is a diagram for illustrating a process of performing voice recognition through a wake-up engine and an ASR model according to the disclosure.

Referring to FIG. 3, when a voice signal is received, the electronic device 100 may identify whether a wake-up word is included in the voice signal through the wake-up engine 10. The wake-up engine 10 according to the disclosure is an engine that identifies whether a wake-up word is included in the voice signal, and identifies whether to provide a voice recognition function corresponding to the voice signal. That is, if it is identified that a wake-up word is included in a voice signal through the wake-up engine 10, the electronic device 100 may control the ASR model 20 to continuously perform voice recognition corresponding to the received voice signal, and acquire a text corresponding to the voice signal. In contrast, if it is identified that a wake-up word is not included in the voice signal through the wake-up engine 10, the electronic device 100 may control the ASR model 20 to not perform voice recognition for the received voice signal. For example, the wake-up engine 10 may be trained to identify a wake-up word for activating a voice recognition system providing voice recognition that is included in the electronic device 100 in a voice signal. A wake-up word for activating the voice recognition system may vary according to the type of the voice recognition system.

Also, when a voice signal is received, the electronic device 100 may perform voice recognition by the first voice recognition method for the first voice signal section including a wake-up word through the ASR model 20. Specifically, if the first voice signal section including a wake-up word is received, the electronic device 100 may control the wake-up engine 10 to identify whether a wake-up word is included in the first voice signal section, and at the same time, control the ASR model 20 to perform voice recognition for the first voice signal section by the first voice recognition method. However, the disclosure is not limited thereto, and the electronic device 100 may control the ASR model 20 to perform voice recognition for the voice signal after identifying that a wake-up word is included in a received voice signal through the wake-up engine 10.

Further, in the case of using the first voice recognition method for the first voice signal section, and performing voice recognition for the second voice signal section by using the second voice recognition method as in the above-described embodiment, the time spent for voice recognition can be reduced more than the conventional case of performing voice recognition only by the second method, as in Table 1.

TABLE 1

| Voice recognition method | Average Time Spent (msec) | | | Accuracy | |
|---|---|---|---|---|---|
| | "Hi" | "Hi, Bixby" | Final Result | WER | SER |
| Second voice recognition method | 1211.9 | 2923.9 | 3359.7 | 19.18 | 45.24 |
| First voice recognition method + Second voice recognition method | 1212.7 | 2325.9 | 3335.1 | 19.22 | 45.30 |

TABLE 1-continued

| Voice recognition method | Average Time Spent (msec) | | | Accuracy | |
|---|---|---|---|---|---|
| | "Hi" | "Hi, Bixby" | Final Result | WER | SER |

Table 1 is a table indicating the time spent for processing a plurality of voice signals including the first voice signal section including "Hi, Bixby" which is a wake-up word and a plurality of second voice signal sections including various instruction words through the ASR model according to an embodiment of the disclosure. Specifically, referring to Table 1, voice recognition through "first voice recognition method+second voice recognition method" indicates the time spent for voice processing of the ASR model when performing voice recognition for the first voice signal section including "Hi, Bixby" through the first voice recognition method, and performing the second voice recognition method for the second voice signal sections including instruction words regarding a plurality of voice signals according to the disclosure. Also, voice recognition through "second voice recognition method" indicates the time spent for voice processing of the ASR model when performing the conventional second voice recognition method for all of the first voice signal section including "Hi, Bixby" and the second voice signal sections including instruction words regarding a plurality of voice signals. Further, WER is a "Word Error Rate," which means the ratio of words wherein voice recognition errors occurred among a plurality of words included in a voice signal, and as the WER value is lower, it indicates that the accuracy of voice recognition is higher. Also, SER is a "Sentence Error Rate," which means the ratio of sentences wherein errors occurred in sentences included in a voice signal, and as the SER value is lower, it indicates that the accuracy of voice recognition is higher. Meanwhile, the numerical values in Table 1 are merely experimental data according to an embodiment of the disclosure, and the disclosure is not limited to the numerical values in Table 1.

Figure 4:
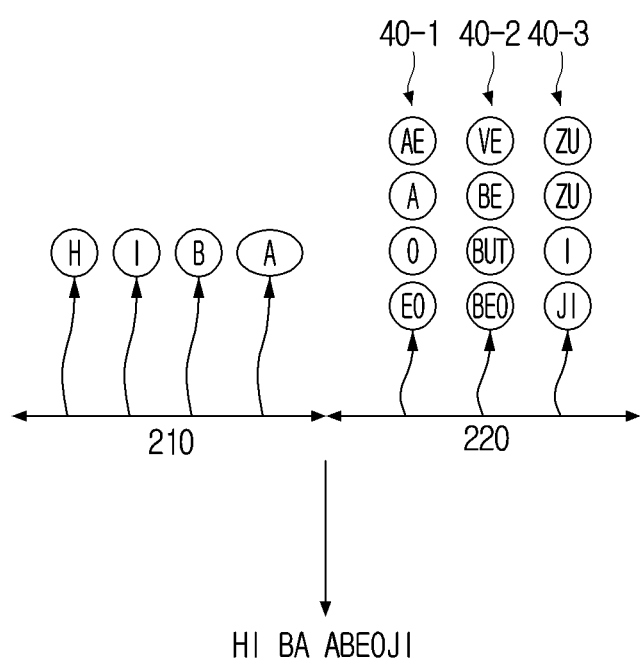
FIG. 4 is a diagram for illustrating a process of performing voice recognition by acquiring candidate texts of a specific number per predetermined frame included in a voice signal according to an embodiment of the disclosure.

FIG. 4 is a diagram for illustrating a process of acquiring a specific number of candidate texts in each frame of a plurality of predetermined frames included in a voice signal, and performing voice recognition according to an embodiment of the disclosure.

Referring to FIG. 4, for the first voice signal section 210 corresponding to a wake-up word, the electronic device 100 may acquire one (the first number) text in each frame (e.g., 10 ms) of a plurality of predetermined frames and identify a text corresponding to the first voice signal section 210, and for the second voice signal section 220 corresponding to an instruction word, the electronic device 100 may acquire four (the second number) candidate texts in each frame (e.g., 10 ms) of a plurality of predetermined frames and control the ASR model 20 to identify a text corresponding to the second voice signal section 220. That is, for the first voice signal section 210, the electronic device 100 may control the ASR model 20 to identify one text in each frame of the plurality of predetermined frames (the first voice recognition method), sum up the identified texts, and identify a text corresponding to the first voice signal section 210. That is, through the ASR model 20, the electronic device 100 may identify texts which are 'h,' 'i,''b,' 'a' the predetermined frames included in the first voice signal section 210, and identify that the text included in the first voice signal section 210 is 'Hi, b a.' Here, 'Hi, b a' may be a wake-up word for activating the voice recognition function of the electronic device 100.

In contrast, for the second voice signal section 220, the electronic device 100 may identify four candidate texts in each frame of the plurality of predetermined frames, sum up the plurality of identified candidate texts in the predetermined frames, and control the ASR model 20 to identify a corresponding text in each of the predetermined frames (the second voice recognition method). That is, through the ASR model 20, the electronic device 100 may acquire four texts which are 'ae,' 'a,''o,' 'eo' in the first frame 40-1 included in the second voice signal section 220, acquire four texts which are 've,' 'be,' 'but,' 'beo' in the second frame 40-2, and acquire four texts which are 'tsu,' 'zu,' 'i,' 'jf' in the third frame 40-3. Then, through the ASR model 20, the electronic device 100 may identify that the text corresponding to the first frame 40-1 is 'a' among the four texts included in the first frame 40-1, based on the four texts acquired in the second frame 40-2 and the four texts acquired in the third frame 40-3. Also, through the ASR model 20, the electronic device 100 may identify that the text corresponding to the second frame 40-2 is 'beo' among the four texts included in the second frame 40-2, based on the four texts acquired in the first frame 40-1 and the four texts acquired in the third frame 40-3. Further, through the ASR model 20, the electronic device 100 may identify that the text corresponding to the third frame 40-3 is among the four texts included in the third frame 40-3, based on the four texts acquired in the first frame 40-1 and the four texts acquired in the second frame 40-2. Then, through the ASR model 20, the electronic device 100 may finally identify that the text included in the second voice signal section 220 is 'abeoji.'

As described above, for a voice signal section corresponding to a wake-up word where there are relatively more learning data, the electronic device 100 performs voice recognition by acquiring the first number of candidate texts smaller than the second number of candidate texts, and the cost or the operation amount spent for voice recognition can be reduced.

In the above-described embodiment, a candidate text is acquired in each frame of the plurality of predetermined frames, but the disclosure is not limited thereto. That is, the electronic device 100 may acquire a candidate text or candidate data corresponding to a recognition unit in a predetermined frame corresponding to the recognition unit of the ASR model 20.

FIG. 5 is a diagram for illustrating an intermediate text provided while performing voice recognition for a voice signal according to an embodiment of the disclosure.

The embodiment in 50-1 of FIG. 5 is an embodiment for illustrating an intermediate text that may be provided when performing voice recognition for the first voice signal section 210 of the first section and the second voice signal section 220 of the second section by the second voice recognition method according to the disclosure.

Also, the embodiment in 50-2 of FIG. 5 is an embodiment for illustrating an intermediate text that may be provided when performing voice recognition for the first voice signal section 210 of the first section by the first voice recognition method, and performing voice recognition for the second voice signal section 220 of the second section by the second voice recognition method.

As in the embodiment in 50-1 and the embodiment in 50-2, the electronic device 100 may provide a text corresponding to a voice signal acquired through the ASR model while voice recognition for the voice signal is performed. That is, as in the embodiment in 50-2, if the electronic device 100 performs voice recognition by the first voice recognition method and the second voice recognition method, the processing amount spent for voice recognition can be reduced more than in the embodiment in 50-1. Accordingly, in the embodiment in 50-2, an intermediate text can be provided faster than in the embodiment in 50-1.

Figure 6:
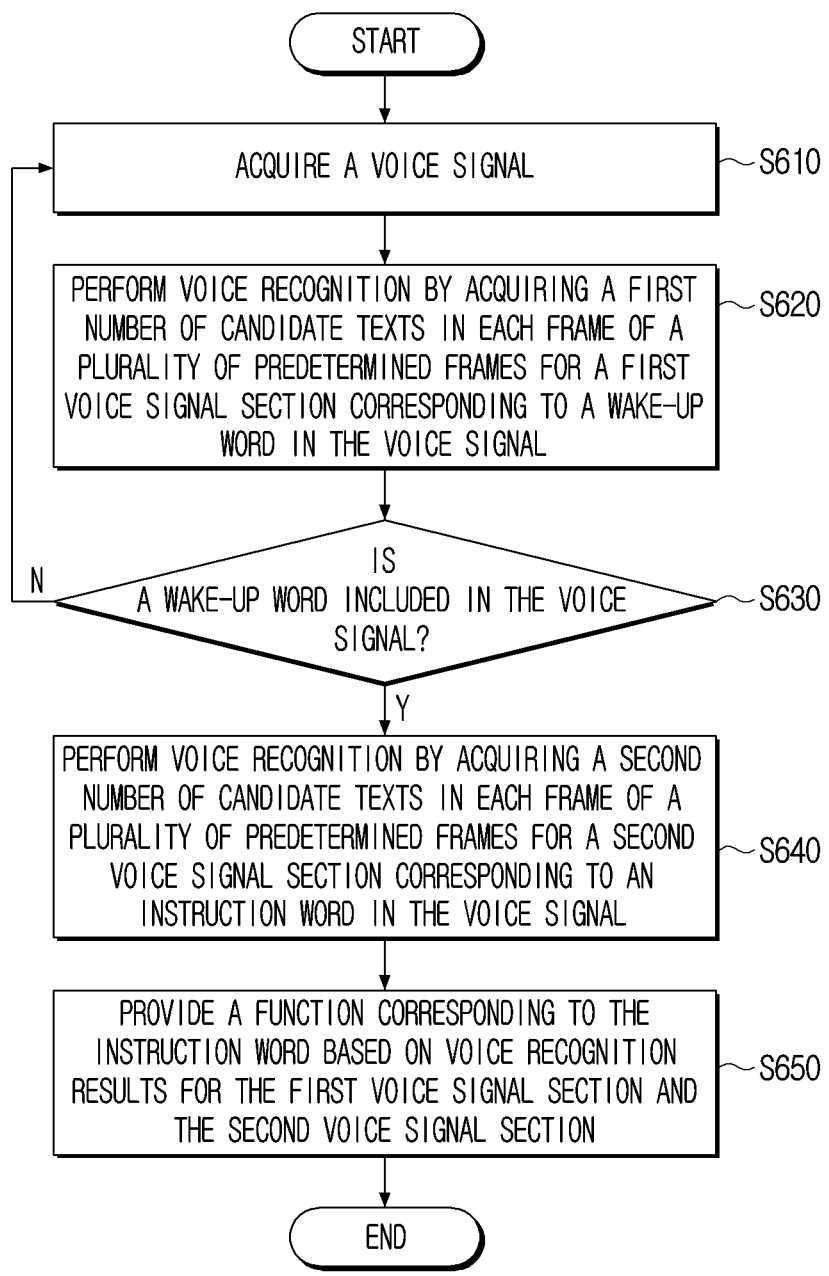
FIG. 6 is a flow chart illustrating a control method of an electronic device according to an embodiment of the disclosure.

FIG. 6 is a flow chart illustrating a control method of an electronic device according to an embodiment of the disclosure.

Referring to FIG. 6, the electronic device 100 may acquire a voice signal in operation S610. Here, the voice signal may include voice signal sections corresponding to a wake-up word and an instruction word.

Then, for the first voice signal section corresponding to a wake-up word in the voice signal, the electronic device 100 may perform voice recognition by acquiring the first number of candidate texts in each frame of a plurality of predetermined frames and perform voice recognition (the first voice recognition method) in operation S620. Specifically, through the ASR model, the electronic device 100 may perform voice recognition by acquiring the first number of candidate texts in each frame of the plurality of predetermined frames for the first voice signal section. For example, if a voice signal section corresponding to a recognition unit (e.g., a syllable) of the first ASR model of the first word among wake-up words is identified through the ASR model, the electronic device 100 may perform voice recognition by acquiring the first number of candidate texts in each frame of the plurality of predetermined frames from a section after the identified voice signal section to a voice signal section corresponding to a recognition unit (e.g., a syllable) of the last ASR model of the last word among the wake-up (the first voice recognition method).

Then, the electronic device 100 may identify whether a wake-up word is included in the voice signal in operation S630. Specifically, while performing the operation of S620, the electronic device 100 may identify whether a wake-up word is included in the first voice signal section through the wake-up engine. If it is identified that a wake-up word is not included in the voice signal in operation S630-N, the electronic device 100 may return to the operation of S610, and acquire a new voice signal.

If it is identified that a wake-up word is included in the voice signal in operation S630-Y, the electronic device 100 may perform voice recognition by acquiring the second number of candidate texts in each frame of a plurality of predetermined frames for the second voice signal section corresponding to an instruction word in the voice signal (the second voice recognition method) in operation S640. Specifically, through the ASR model, the electronic device 100 may perform voice recognition by acquiring the second number of candidate texts in each frame of the plurality of predetermined frames for the second voice signal section.

Then, the electronic device 100 may provide a function corresponding to the instruction word based on voice recognition results for the first voice signal section and the second voice signal section in operation S650. As a function corresponding to the instruction word, for example, the electronic device 100 may provide various functions that can be provided through voice recognition such as an operation of executing an application corresponding to the instruction word, an operation of providing a response corresponding to the instruction word, etc.

Figure 7:
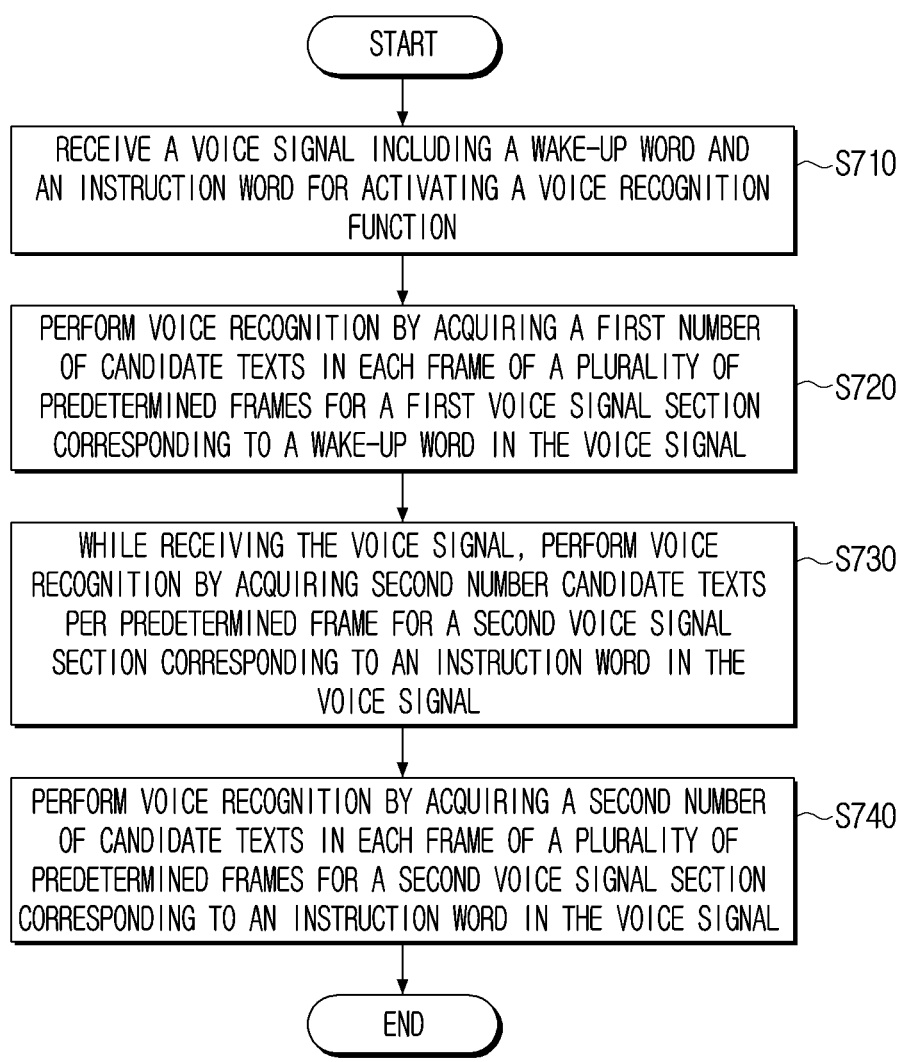
FIG. 7 is a flow chart illustrating a control method of an electronic device according to an embodiment of the disclosure.

FIG. 7 is a flow chart illustrating a control method of an electronic device according to an embodiment of the disclosure.

The electronic device 100 may receive a voice signal including a wake-up word and an instruction word for activating the voice recognition function in operation S710. For example, the electronic device 100 may receive a voice signal including a wake-up word and an instruction word through a microphone in the electronic device 100 or an external microphone.

Then, while receiving the voice signal, the electronic device 100 may acquire the first number of candidate texts in each frame of the plurality of predetermined frames for the first voice signal section corresponding to the wake-up word in the voice signal and perform voice recognition in operation S720. For example, the first number may be one, and in this case, the electronic device 100 may acquire one text in each frame of the plurality of predetermined frames for the first voice signal section through the ASR model, and identify the acquired texts as texts corresponding to the first voice signal section.

Also, while receiving the voice signal, the electronic device 100 may perform voice recognition by acquiring the second number of candidate texts in the predetermined frame for the second voice signal section corresponding to the instruction word in the voice signal in operation S730. As an example, as described in FIG. 4, the electronic device 100 may identify a text corresponding to the second voice signal section based on a plurality of acquired text candidates corresponding to the second voice signal section through the ASR model.

Then, the electronic device 100 may provide a function corresponding to the instruction word included in the voice signal based on voice recognition results for the first voice signal section and the second voice signal section in operation S740.

Figure 8:
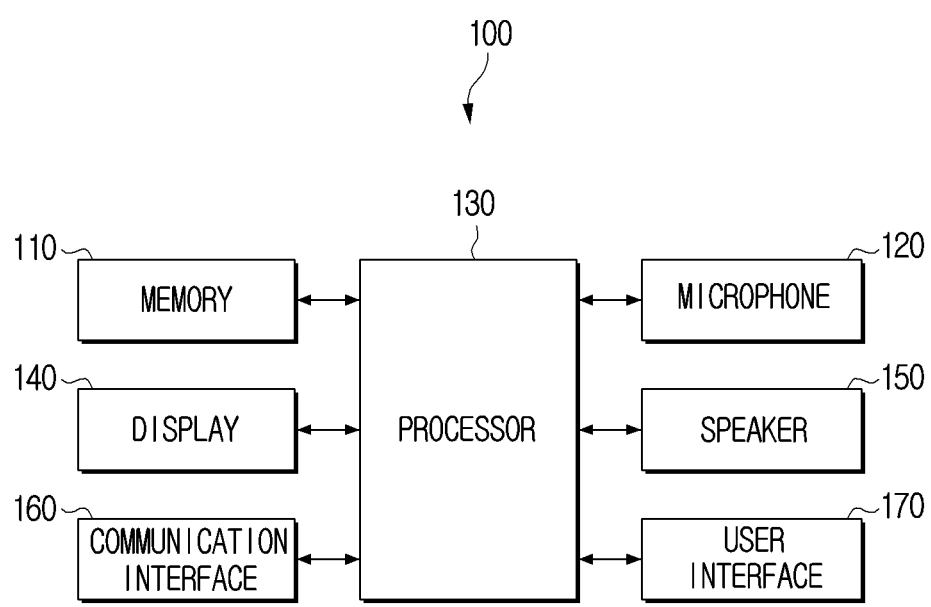
FIG. 8 is a diagram illustrating a configuration of an electronic device according to an embodiment of the disclosure.

FIG. 8 is a diagram illustrating a configuration of an electronic device according to an embodiment of the disclosure. Referring to FIG. 8, the electronic device 100 may include a memory 110, a microphone 120, a processor 130, a display 140, a speaker 150, a communication interface 160, and a user interface 170. Meanwhile, as the memory 110 and the processor 130 illustrated in FIG. 8 correspond to the memory 110 and the processor 130 in FIG. 1, overlapping explanation will be omitted. Also, depending on implementation examples of the electronic device 100, it is obvious that some of the components in FIG. 8 can be removed or other components can be added.

The display 140 is a component for the electronic device 100 to visually provide information. The electronic device 100 may include one or more displays 140, and display a response to an input user voice instruction, an inquiry regarding a user voice instruction, notification information, etc. through the display 140. Here, the display 140 may be implemented as a liquid crystal display (LCD), a plasma display panel (PDP), organic light emitting diodes (OLED), transparent OLED (TOLED), micro LED, etc. Also, the display 140 may be implemented in a form of a touch screen that can detect a touch manipulation of a user, and it may also be implemented as a flexible display that can be folded or bent. In particular, the display 140 may visually provide a response corresponding to an instruction included in a voice signal.

The speaker 150 is a component for the electronic device 100 to acoustically provide information. The electronic device 100 may include one or more speakers 150, and output a response to an instruction word included in an input voice signal, an inquiry regarding an instruction word included in a voice signal, notification information, etc. as audio signals through the speaker 150. Meanwhile, the component for outputting audio signals may be implemented as the speaker 150, but this is merely an example, and the component can obviously be implemented as an output terminal.

The communication interface 160 is a component that can perform communication with an external device. Meanwhile, communicative connection of the communication interface 160 with an external device may include communicating via a third device (e.g., a repeater, a hub, an access point, a server, or a gateway, etc.). Wireless communication may include, for example, cellular communication using at least one of LTE, LTE Advance (LTE-A), code division multiple access (CDMA), wideband CDMA (WCDMA), a universal mobile telecommunications system (UMTS), Wireless Broadband (WiBro), or a Global System for Mobile Communications (GSM). According to an embodiment, wireless communication may include, for example, at least one of wireless fidelity (WiFi), Bluetooth, Bluetooth low energy (BLE), Zigbee, near field communication (NFC), Magnetic Secure Transmission, radio frequency (RF), or a body area network (BAN). Wired communication may include, for example, at least one of a universal serial bus (USB), a high definition multimedia interface (HDMI), a recommended standard232 (RS-232), power line communication, or a plain old telephone service (POTS). Networks wherein wireless communication or wired communication is performed may include a telecommunication network, for example, at least one of a computer network (e.g.: a LAN or a WAN), the Internet, or a telephone network.

In particular, the communication interface 160 may perform communication with an external server, and provide a voice recognition function in the electronic device 100. However, the disclosure is not limited thereto, and the electronic device 100 may provide a voice recognition function in the electronic device 100 without communication with an external server.

The user interface 170 is a component for receiving input of a user instruction for controlling the electronic device 100. In particular, the user interface 170 may be implemented as a device such as a button, a touch pad, a mouse, and a keyboard, or implemented as a touch screen that can perform both of the display function and a manipulation input function. Here, a button may be various types of buttons such as a mechanical button, a touch pad, a wheel, etc. formed in any areas such as the front surface part, the side surface part, the rear surface part, etc. of the exterior of the main body of the electronic device 100.

The various embodiments of the disclosure should be interpreted to include various modifications, equivalents, and/or alternatives of the embodiments of the disclosure. Also, with respect to the detailed description of the drawings, similar components may be designated by similar reference numerals.

Also, in the disclosure, expressions such as "have," "may have," "include," and "may include" denote the existence of such characteristics (e.g., elements such as numbers, functions, operations, and components), and do not exclude the existence of additional characteristics.

In addition, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including only A, (2) including only B, or (3) including both A and B. Further, the expressions "first," "second," and the like used in the disclosure may describe various elements regardless of any order and/or degree of importance. Also, such expressions are used only to distinguish one element from another element, and are not intended to limit the elements.

The description in the disclosure that one element (e.g., a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g., a third element). In contrast, the description that one element (e.g., a first element) is "directly coupled" or "directly connected" to another element (e.g., a second element) can be interpreted to mean that still another element (e.g., a third element) does not exist between the one element and the another element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware. Instead, under some circumstances, the expression "a device configured to" may mean that the device "is capable of" performing an operation together with another device or component. For example, the phrase "a sub-processor configured to perform A, B, and C" may mean a dedicated processor (e.g., an embedded processor) for performing the corresponding operations, or a generic-purpose processor (e.g., a CPU or an application processor) that can perform the corresponding operations by executing one or more software programs stored in a memory device.

The term "a part" or "a module" used in the disclosure includes a unit consisting of hardware, software, or firmware, and it may be interchangeably used with terms, for example, logic, a logical block, a component, or a circuit. Also, "a part" or "a module" may be a component consisting of an integrated body or a minimum unit performing one or more functions or a portion thereof. For example, a module may consist of an application-specific integrated circuit (ASIC).

Also, the various embodiments of the disclosure may be implemented as software including instructions stored in machine-readable storage media, which can be read by machines (e.g.: computers). The machines refer to devices that call instructions stored in a storage medium, and can operate according to the called instructions, and the devices may include a laminated display device according to the embodiments described herein. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

In addition, according to an embodiment, the method according to the various embodiments described in the disclosure may be provided while being included in a computer program product. A computer program product refers to a product, and it can be traded between a seller and a buyer. A computer program product can be distributed in the form of a storage medium that is readable by machines (e.g., a compact disc read only memory (CD-ROM)), or distributed on-line through an application store (e.g., PLAY STORE™). In the case of on-line distribution, at least a portion of a computer program product may be stored in a storage medium such as the server of the manufacturer, the server of the application store, and the memory of the relay server at least temporarily, or may be generated temporarily.

Further, each of the components (e.g., a module or a program) according to the various embodiments may consist of a singular object or a plurality of objects. Also, among the aforementioned corresponding sub components, some sub components may be omitted, or other sub components may be further included in the various embodiments. Alternatively or additionally, some components (e.g., a module or a program) may be integrated as an object, and perform the functions performed by each of the components identically or in a similar manner to how they were performed before integration. Also, operations performed by a module, a program, or other components according to the various embodiments may be executed sequentially, in parallel, repetitively, or heuristically. Or, at least some of the operations may be executed in a different order or omitted, or other operations may be added.

What is claimed is:

1. A control method of an electronic device, the control method comprising:
   receiving a voice signal including a wake-up word and an instruction word for activating a voice recognition function;
   performing first voice recognition based on an automatic speech recognition (ASR) model for converting a voice signal into a text by acquiring at least one first candidate text in each frame of a first plurality of predetermined frames for a first voice signal section corresponding to the wake-up word in the voice signal;
   performing second voice recognition by acquiring at least one second candidate text in each frame of a second plurality of predetermined frames for a second voice signal section corresponding to the instruction word in the voice signal; and
   providing a function corresponding to the instruction word based on results of the first voice recognition and the second voice recognition,
   wherein a number of the at least one first candidate text is smaller than a number of the at least one second candidate text, and
   wherein a time duration of each frame of the first plurality of predetermined frames is a same as a time duration of each frame of the second plurality of predetermined frames.

2. The control method of claim 1, wherein the performing the first voice recognition comprises:
   based on the first voice signal section, identifying whether the wake-up word is received by using a wake-up engine for identifying the wake-up word in the voice signal.

3. The control method of claim 2, wherein the performing the second voice recognition comprises:
   based on identifying that the wake-up word is received through the wake-up engine, performing the second voice recognition by acquiring the at least one second candidate text in each frame of the second plurality of predetermined frames for the second voice signal section.

4. The control method of claim 2, wherein the performing the first voice recognition comprises:
   acquiring one text corresponding to each frame of the first plurality of predetermined frames for the first voice signal section by using the ASR model, and the performing the second voice recognition comprises:
   acquiring a plurality of text candidates corresponding to each frame of the second plurality of predetermined frames for the second voice signal section by using the ASR model.

5. The control method of claim 4, wherein the performing the second voice recognition comprises:
   based on the acquired plurality of text candidates corresponding to the second voice signal section, identifying a text corresponding to the second voice signal section.

6. The control method of claim 2, further comprising:
   based on identifying that the wake-up word is not received through the wake-up engine, not performing voice recognition for the second voice signal section.

7. The control method of claim 1, wherein the performing the second voice recognition comprises:
   performing the second voice recognition by acquiring the at least one second candidate text in each frame of the second plurality of predetermined frames for remaining sections excluding the first voice signal section in the voice signal.

8. The control method of claim 1, wherein the performing the first voice recognition comprises:
   while performing voice recognition by acquiring the at least one second candidate text in each frame of the second plurality of predetermined frames for the voice signal, based on identifying the first voice signal section corresponding to the wake-up word, performing the first voice recognition by acquiring the at least one first candidate text in each frame of the first plurality of predetermined frames from a starting time point of the first voice signal section, and the performing the second voice recognition comprises:
   based on the first voice signal section ending while performing the first voice recognition, performing the second voice recognition by acquiring the at least one second candidate text in each frame of the second plurality of predetermined frames from an ending time point of the first voice signal section.

9. The control method of claim 7, wherein the performing the first voice recognition comprises:
   while performing the second voice recognition, based on identifying a voice signal section corresponding to a recognition unit of the ASR model in the wake-up word, performing the first voice recognition.

10. An electronic device comprising:
    a memory including at least one instruction;
    a microphone; and
    a processor configured to execute the at least one instruction to:
      receive a voice signal including a wake-up word and an instruction word for activating a voice recognition function through the microphone,
      perform first voice recognition based on an automatic speech recognition (ASR) model for converting a voice signal into a text by acquiring at least one first candidate text in each frame of a first plurality of predetermined frames for a first voice signal section corresponding to the wake-up word in the voice signal,
      perform second voice recognition by acquiring at least one second candidate text in each frame of a second plurality of predetermined frames for a second voice signal section corresponding to the instruction word in the voice signal, and provide a function corresponding to the instruction word based on results of the first voice recognition and the second voice recognition, wherein a number of the at least one first candidate text is smaller than a number of the at least one second candidate text, and wherein a time duration of each frame of the first plurality of predetermined frames is a same as a time duration of each frame of the second plurality of predetermined frames.

11. The electronic device of claim 10, wherein the processor is further configured to execute the at least one instruction to:

based on the first voice signal section, identify whether the wake-up word is received by using a wake-up engine for identifying the wake-up word in the voice signal.

12. The electronic device of claim 11, wherein the processor is further configured to execute the at least one instruction to:

based on identifying that the wake-up word is received through the wake-up engine, perform the second voice recognition by acquiring the at least one second candidate text in each frame of the second plurality of predetermined frames for the second voice signal section.

13. The electronic device of claim 11, wherein the processor is further configured to execute the at least one instruction to:

acquire one text corresponding to each frame of the first plurality of predetermined frames for the first voice signal section by using the ASR model, and acquire a plurality of text candidates corresponding to each frame of the second plurality of predetermined frames for the second voice signal section by using the ASR model.

14. The electronic device of claim 13, wherein the processor is further configured to execute the at least one instruction to:

based on the acquired plurality of text candidates corresponding to the second voice signal section, identify a text corresponding to the second voice signal section.

15. The electronic device of claim 11, wherein the processor is further configured to execute the at least one instruction to:

based on identifying that the wake-up word is not received through the wake-up engine, control the ASR model to not perform voice recognition for the second voice signal section.

16. The electronic device of claim 11, wherein the processor is further configured to execute the at least one instruction to:

perform the second voice recognition by acquiring the at least one second candidate text in each frame of the second plurality of predetermined frames for remaining sections excluding the first voice signal section in the voice signal.

17. The electronic device of claim 11, wherein the processor is further configured to execute the at least one instruction to:

while performing voice recognition by acquiring the at least one second candidate text for the voice signal, based on identifying the first voice signal section corresponding to the wake-up word, perform the first voice recognition by acquiring the at least one first candidate text in each frame of the first plurality of predetermined frames from a starting time point of the first voice signal section, and based on the first voice signal section ending while performing the first voice recognition, perform the second voice recognition by acquiring the at least one second candidate text in each frame of the second plurality of predetermined frames from an ending time point of the first voice signal section.

18. The electronic device of claim 16, wherein the processor is further configured to execute the at least one instruction to:

while performing the second voice recognition, based on identifying a voice signal section corresponding to a recognition unit of the ASR model in the wake-up word, perform the first voice recognition.

* * * * *